US012155154B2

(12) United States Patent
Shen et al.

(10) Patent No.: US 12,155,154 B2
(45) Date of Patent: Nov. 26, 2024

(54) FLOATING CONNECTOR AND ASSEMBLY THEREOF

(71) Applicant: Molex, LLC, Lisle, IL (US)

(72) Inventors: Yu Shen, Shanghai (CN); Feng Chen, Shanghai (CN)

(73) Assignee: Molex, LLC, Lisle, IL (US)

( * ) Notice: Subject to any disclaimer, the term of this patent is extended or adjusted under 35 U.S.C. 154(b) by 345 days.

(21) Appl. No.: 17/880,757

(22) Filed: Aug. 4, 2022

(65) Prior Publication Data

US 2023/0044130 A1 Feb. 9, 2023

(30) Foreign Application Priority Data

Aug. 5, 2021 (CN) ......................... 202110895249.3

(51) Int. Cl.
*H01R 13/631* (2006.01)

(52) U.S. Cl.
CPC ................................ *H01R 13/6315* (2013.01)

(58) Field of Classification Search
CPC ............ H01R 13/6315; H01R 13/6593; H01R 13/6581; H01R 24/40; H01R 24/50
USPC .................................................. 439/581, 252
See application file for complete search history.

(56) References Cited

U.S. PATENT DOCUMENTS 4,012,105 A * 3/1977 Biddle ................... H01R 24/40 439/700
5,329,262 A 7/1994 Fisher, Jr.
5,516,303 A 5/1996 Yohn et al.
6,053,777 A * 4/2000 Boyle ................ H01R 13/2421 439/700
6,758,680 B2 * 7/2004 Duquerroy ............. H01R 24/50 439/63
6,776,668 B1 8/2004 Scyoc et al.
(Continued)

FOREIGN PATENT DOCUMENTS

CN 201887154 U 6/2011
CN 202487823 U 10/2012
(Continued)

*Primary Examiner* — Marcus E Harcum

(57) ABSTRACT

A floating connector and an assembly thereof are provided. The floating connector includes: a center conductive structure which includes a main body, a contact pin which is movably mounted in a front portion of the main body and a center spring which is mounted between the contact pin and the main body, a rear portion of the main body is provided with a mating cavity, an elastic mating portion is provided in the mating cavity and is capable of elastically deforming in a radial direction which is perpendicular to a front-rear direction; an insulative body which surrounds an outer circumference of the center conductive structure; and an outer conductive structure comprising a first conductive shell which is provided to an outer circumference of the insulative body, a second conductive shell which is movable, and an outer spring which is positioned between the first conductive shell and the second conductive shell, at least one of the first conductive shell and the second conductive shell is provided with an elastic contact arm, and the first conductive shell and the second conductive shell maintain electrical contact via the elastic contact arm. The present disclosure can promote stability of electrical contact.

11 Claims, 16 Drawing Sheets

(56) References Cited

U.S. PATENT DOCUMENTS

| | | | | |
|---|---|---|---|---|
| 8,087,954 | B2 * | 1/2012 | Fuchs | H01R 13/6275<br>439/352 |
| 8,641,446 | B1 * | 2/2014 | Chen | H01R 24/52<br>439/578 |
| 11,025,008 | B2 * | 6/2021 | Kim | H01R 13/052 |
| 11,121,511 | B1 * | 9/2021 | Long | H01R 13/2421 |
| 11,239,616 | B2 * | 2/2022 | Park | H01R 12/714 |
| 11,569,614 | B2 * | 1/2023 | Tsuchiya | H01R 13/6315 |
| 2021/0057837 | A1 * | 2/2021 | Wang | H01R 13/17 |
| 2021/0313746 | A1 * | 10/2021 | Kato | H01R 13/6215 |
| 2022/0131301 | A1 * | 4/2022 | Volkov | H01R 12/712 |

FOREIGN PATENT DOCUMENTS

| | | | | | |
|---|---|---|---|---|---|
| CN | 111162398 | A | | 5/2020 | |
| CN | 111162419 | A | * | 5/2020 | H01R 12/71 |
| CN | 210897721 | U | | 6/2020 | |
| CN | 211829282 | U | | 10/2020 | |
| TW | M400687 | U | | 3/2011 | |
| TW | M603212 | U | | 10/2020 | |

* cited by examiner

FLOATING CONNECTOR AND ASSEMBLY THEREOF

RELATED APPLICATIONS

This application claims priority to Chinese Patent Application Serial No. 202110895249.3, filed Aug. 5, 2021, which is incorporated herein by reference in its entirety.

TECHNICAL FIELD

The present disclosure relates to the technical field of electrical connectors, and particularly relates to a floating connector and an assembly thereof.

BACKGROUND ART

Chinese utility model patent CN211829282U discloses a floating-type connector which includes a sliding main body, an insulator, an inner conductor, an outer conductor, the inner conductor is provided at an axial center of a sleeve of the sliding main body via the insulator, the outer conductor slidably sheathes an outer circular circumference of the sleeve and maintains contact and conduction with the sleeve, the inner conductor includes a fixed terminal and a movable pin, the fixed terminal is fixedly connected with the insulator, the movable pin is coaxially provided to an end of the fixed terminal and maintains contact and conduction with the fixed terminal, an external spring plate is fixed to the outer circular circumference of the sleeve of the sliding main body and connects with an outer wall of the outer conductor.

In the connector, the outer conductor and the sleeve slide relative to each other and contact each other to realize conduction and the movable pin and the fixed terminal coaxially contact each other to realize conduction, when a PCB positioned at a side of the connector is subjected to a force to cause the PCB to be offset in an axial position of the PCB, the connector always maintain the conduction states to assure stability of signal transmission. However, in this solution, if the PCB is subjected to a force to cause the PCB to be inclined and to be offset in an radial direction position of the PCB perpendicular to an axis the connector, sliding between the outer conductor and the sleeve are easily stuck, at the same time, the fixed terminal fixed in the insulator cannot maintain good electrical connection with another connector when there is offset in the radial direction position. Moreover, such a floating connector makes assembling and structure of this design become more complex due to introduction of the external spring plate, so the floating connector needs to be further improved.

SUMMARY

A technical problem to be solved by the present disclosure is to provide a floating connector and an assembly thereof which can maintain good electrical connection in a vibrating environment so as to overcome the deficiency in the above prior art.

The present disclosure employs following technical solutions.

According to one aspect of the present disclosure, the present disclosure provides a floating connector comprising: a center conductive structure which comprises a main body, a contact pin which is movably mounted in a front portion of the main body and a center spring which is mounted between the contact pin and the main body, a rear portion of the main body is provided with a mating cavity, an elastic mating portion is provided in the mating cavity and being capable of elastically deforming in a radial direction which is perpendicular to a front-rear direction; an insulative body which surrounds an outer circumference of the center conductive structure; and an outer conductive structure comprising a first conductive shell which is provided to an outer circumference of the insulative body, a second conductive shell which movably sheathes the outer circumference of the insulative body, and an outer spring which is positioned between the first conductive shell and the second conductive shell, the second conductive shell being positioned in the first conductive shell, at least one of the first conductive shell and the second conductive shell is provided with an elastic contact arm, and the first conductive shell and the second conductive shell maintain electrical contact via the elastic contact arm.

According to another aspect of the present disclosure, the present disclosure provides a floating connector assembly, comprising the floating connector as above and a cable connector which mates with the floating connector from behind; the cable connector comprises a center conductive pin, a cable sealing member which sheathes an outer circumference of the center conductive pin, an outer shell which further sheathes an outer circumference of the cable sealing member, and a cable which is electrically connected behind the center conductive pin and the outer shell; the center conductive pin is inserted into the mating cavity of the floating connector and contacts the elastic mating portion; the outer shell sheathes an outer circumference of the first conductive shell of the floating connector.

In comparison with the prior art, the present disclosure at least has following advantages: in the floating connector of the present disclosure, the center conductive structure has the contact pin which can elastically slide along the front-rear direction and the elastic mating portion which is positioned to the rear portion of the main body and is capable of elastically deforming in the radial direction perpendicular to the front-rear direction, so that the center conductive structure can maintain central electrical contact when there is deformation in the front-rear direction and the radial direction; the outer conductive structure has the first conductive shell and the second conductive shell which can elastically slide in the front-rear direction, at the same time the first conductive shell and the second conductive shell also can maintain electrical contact by means of the elastic contact arm when the first conductive shell and the second conductive shell are inclined relative to each other, so that electrical contact at the outer circumference can be maintained when there is deformation in the front-rear direction and the radial direction; therefore, the floating connector is capable of maintaining good electrical connection in a vibrating environment, and promotes stability of electrical contact. At the same time, the present disclosure further avoids an independent external spring plate being introduced therein, and simplifies the structure and an assembling step.

DETAILED DESCRIPTION OF THE PREFERRED EMBODIMENTS

Figure 1:
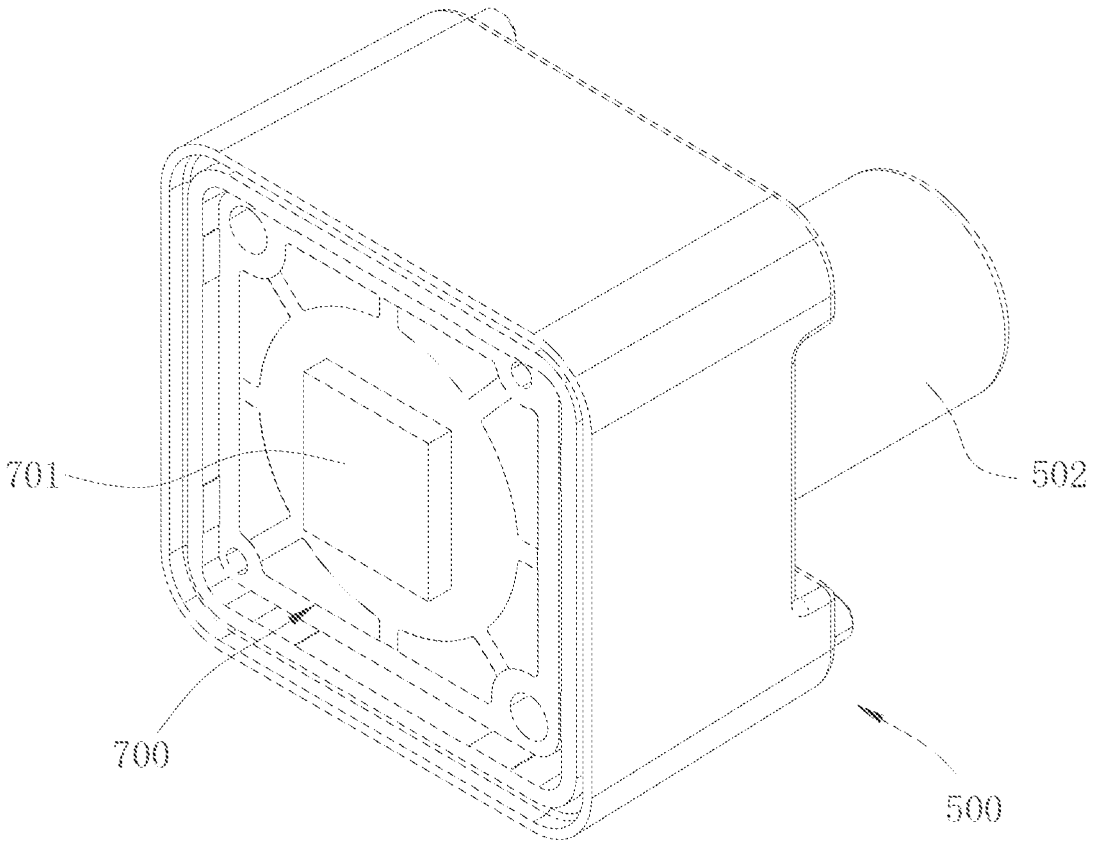
FIG. 1 is a schematic view of a preferred embodiment of a floating connector assembly of the present disclosure in use.
Figure 2:
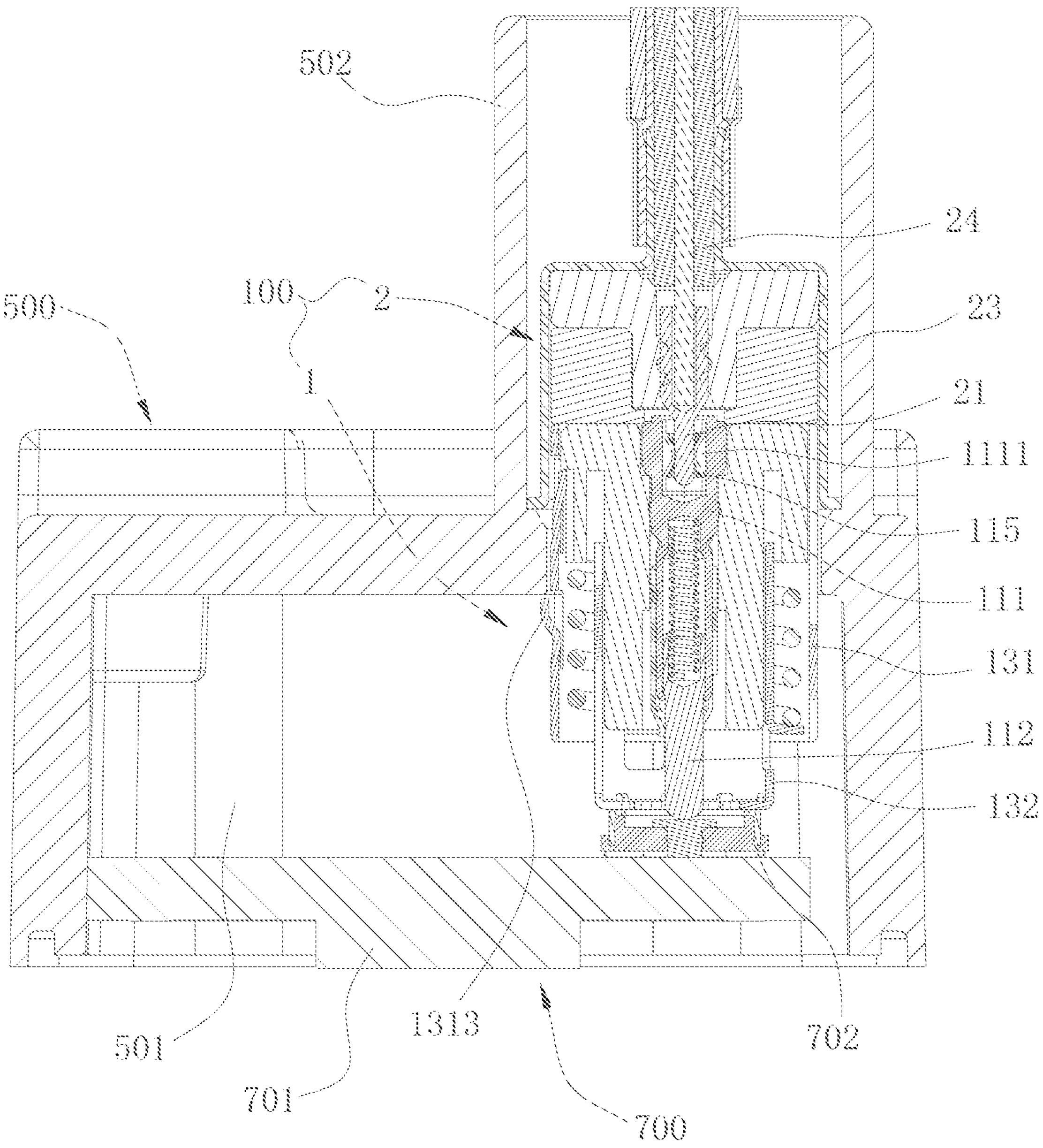
FIG. 2 is a cross sectional view of FIG. 1
Figure 3:
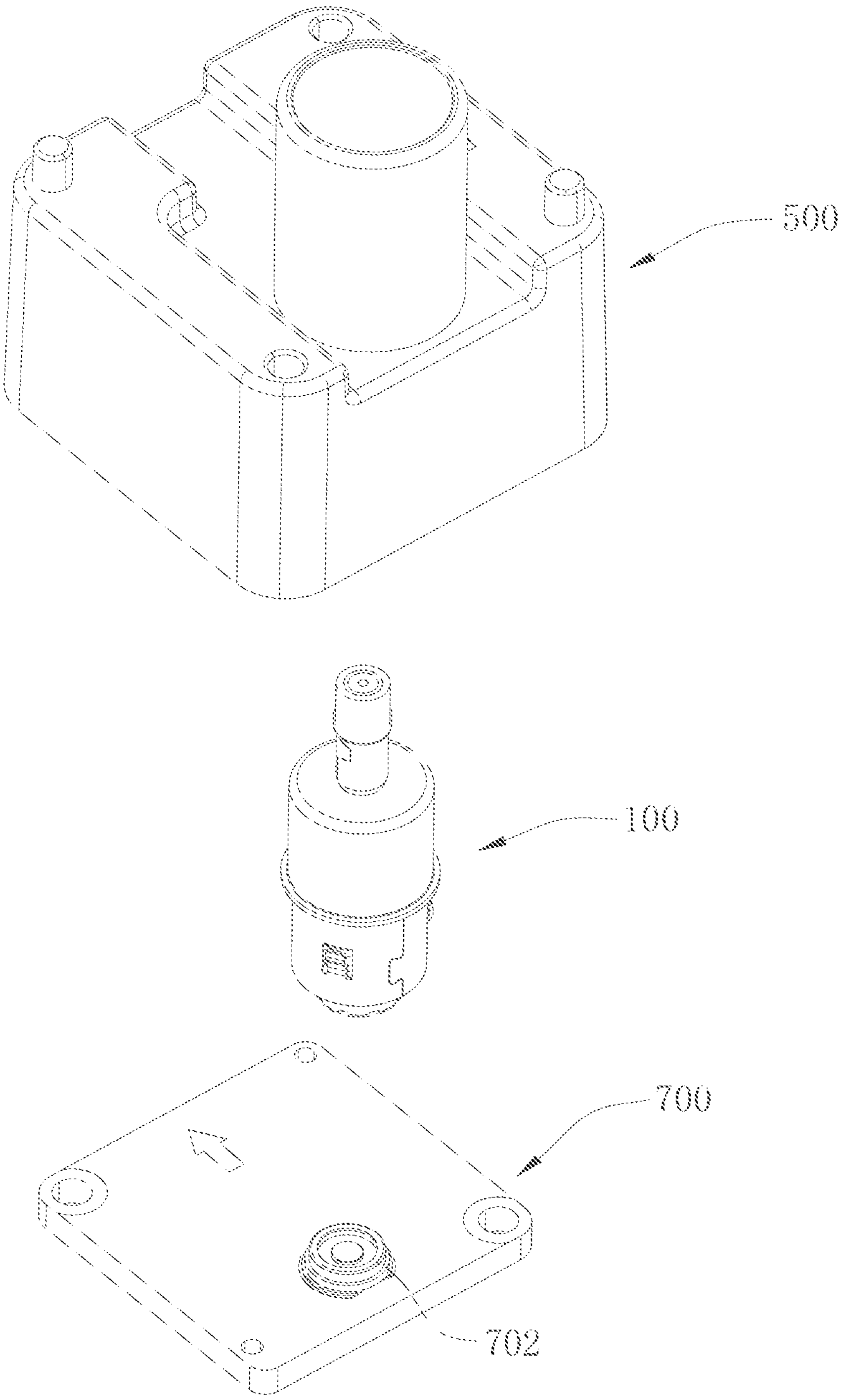
FIG. 3 is a perspective exploded view of FIG. 1.
Figure 4:
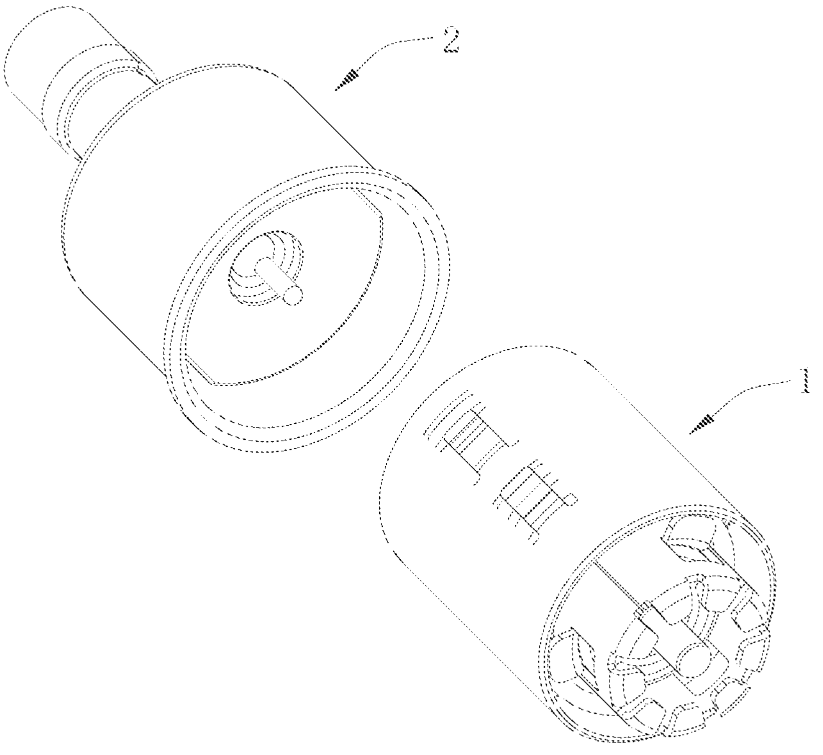
FIG. 4 and FIG. 5 are perspective exploded views of the floating connector assembly of FIG. 3 from two different angles.
Figure 5:
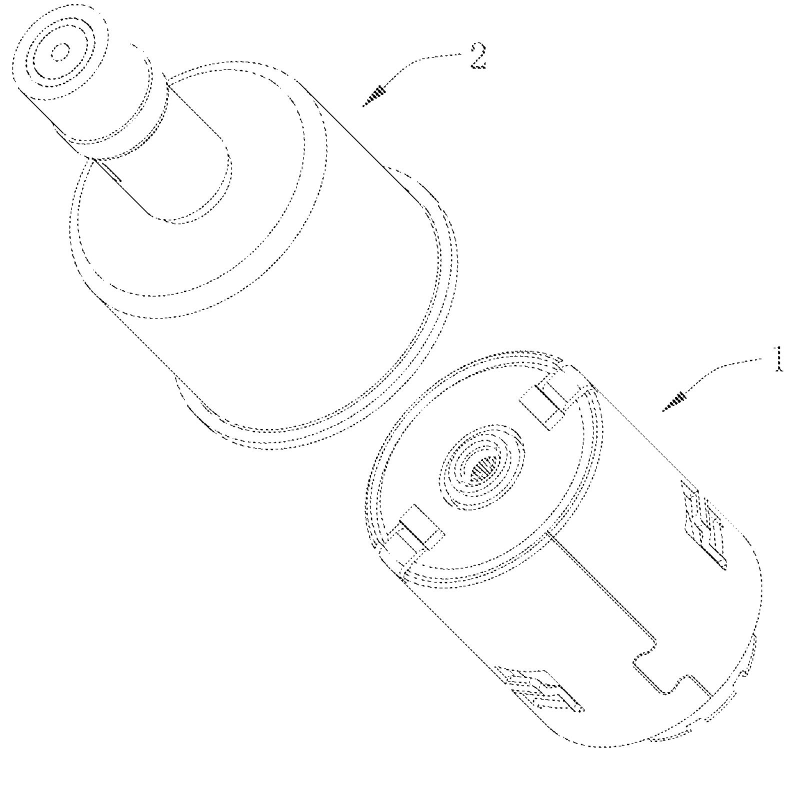

While the present disclosure may be susceptible to embodiments in different forms, there are shown in the figures, and will be described herein in detail, are only specific embodiments, with the understanding that the present disclosure is to be considered as an exemplification of the principles of the present disclosure, and is not intended to limit the present disclosure to that as illustrated.

As such, references to a feature are intended to describe a feature of an embodiment of the present disclosure do not to imply that every embodiment thereof must have the described feature. Furthermore, it should be noted that the description illustrates a number of features.

While certain features may be combined together to illustrate potential system designs, those features may also be used in other combinations not expressly described. Thus, the described combinations are not intended to be limiting, unless otherwise noted.

In the embodiments illustrated in the figures, representations of directions such as up, down, left, right, front and rear, used for explaining the structure and movement of the various components of the present disclosure, are not absolute, but relative. These representations are appropriate when the components are in the position shown in the figures. If the description of the position of the components changes, however, these representations are to be changed accordingly.

Hereinafter, preferred embodiments of the present disclosure will be described in detail in combination with the drawings of the present specification.

Referring to FIG. 1 to FIG. 5, a preferred embodiment of the present disclosure provides a floating connector assembly 100. The floating connector assembly 100 includes a floating connector 1 and a cable connector 2 which mates with the floating connector 1 from behind.

In use, the floating connector assembly 100 may be mounted in an image picking up module 500 and may be electrical connected with a circuit board 700 which is mounted in the image picking up module 500. The image picking up module 500 is provided with a receiving cavity 501 which is positioned in the interior of the image picking up module 500 and is opened at a front end of the receiving cavity 501, the image picking up module 500 is provided with a cable connection post 502 which extends rearwardly. The circuit board 700 is received in the receiving cavity 501, a front surface of the circuit board 700 is provided with an electronic component 701, a rear surface of the circuit board 700 is provided with an electrical connector 702, the electrical connector 702 and the electronic component 701 are electrically connected together via a circuit formed in the circuit board 700. Preferably, the electronic component 701 is an image picking up sensor, the image picking up module 500 may be mounted on a vehicle to form a vehicle camera assembly, correspondingly, the floating connector assembly 100 operates together with the image picking up module 500 in a vibrating environment.

The floating connector assembly 100 enters into the receiving cavity 501 via the cable connection post 502, a front end of the floating connector 1 is electrically connected with the electrical connector 702, the cable connector 2 extends out of a rear end of the cable connection post 502 to be connected to an external electronic device (not shown), so that signal transmission between the electronic component 701 and the external electronic device are realized via the floating connector assembly 100.

Figure 6:
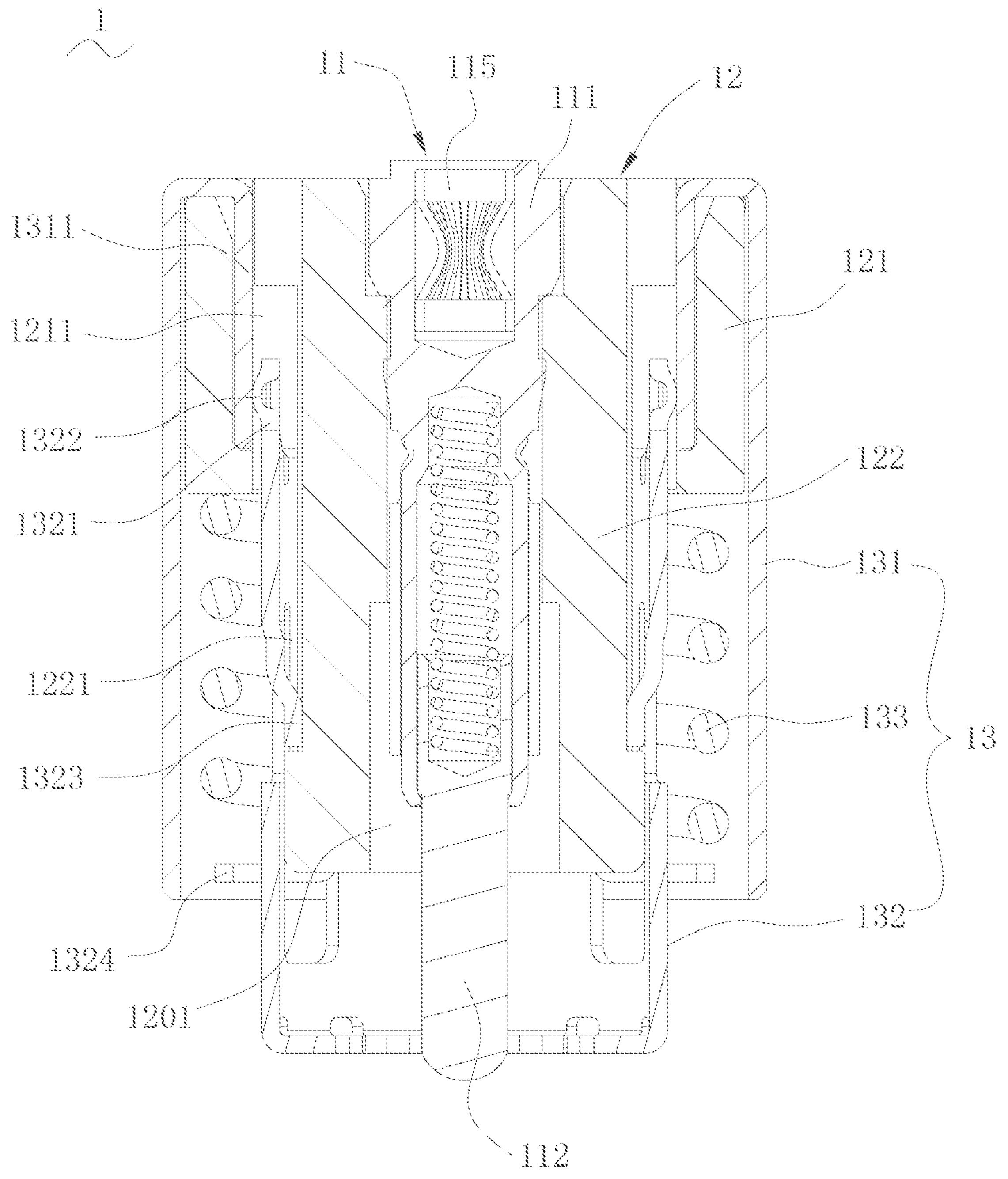
FIG. 6 is a cross sectional view of a floating connector of FIG. 4.
Figure 7:
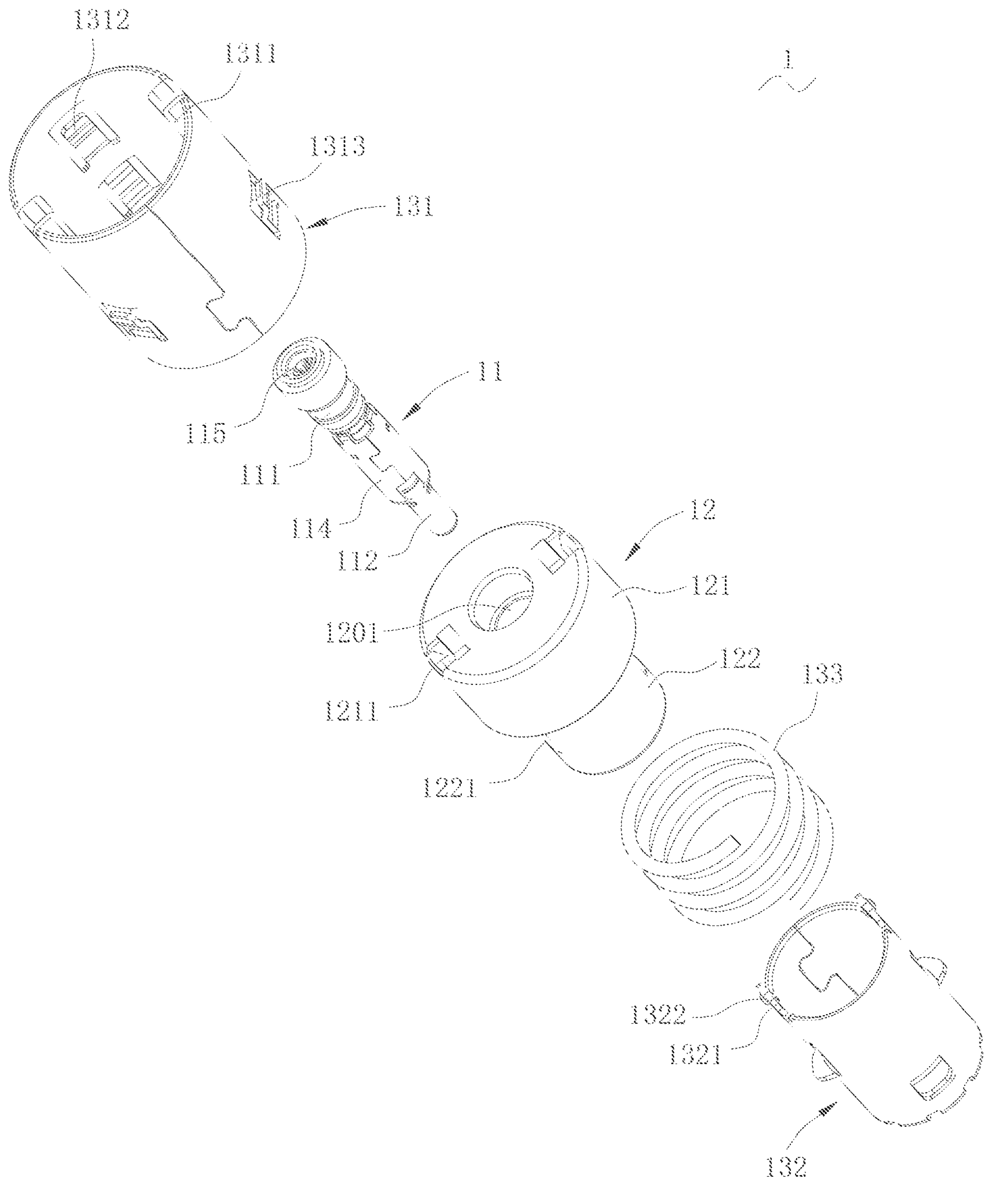
FIG. 7 and FIG. 8 are perspective exploded views of the floating connectors of FIG. 4 from two different angles.
Figure 8:
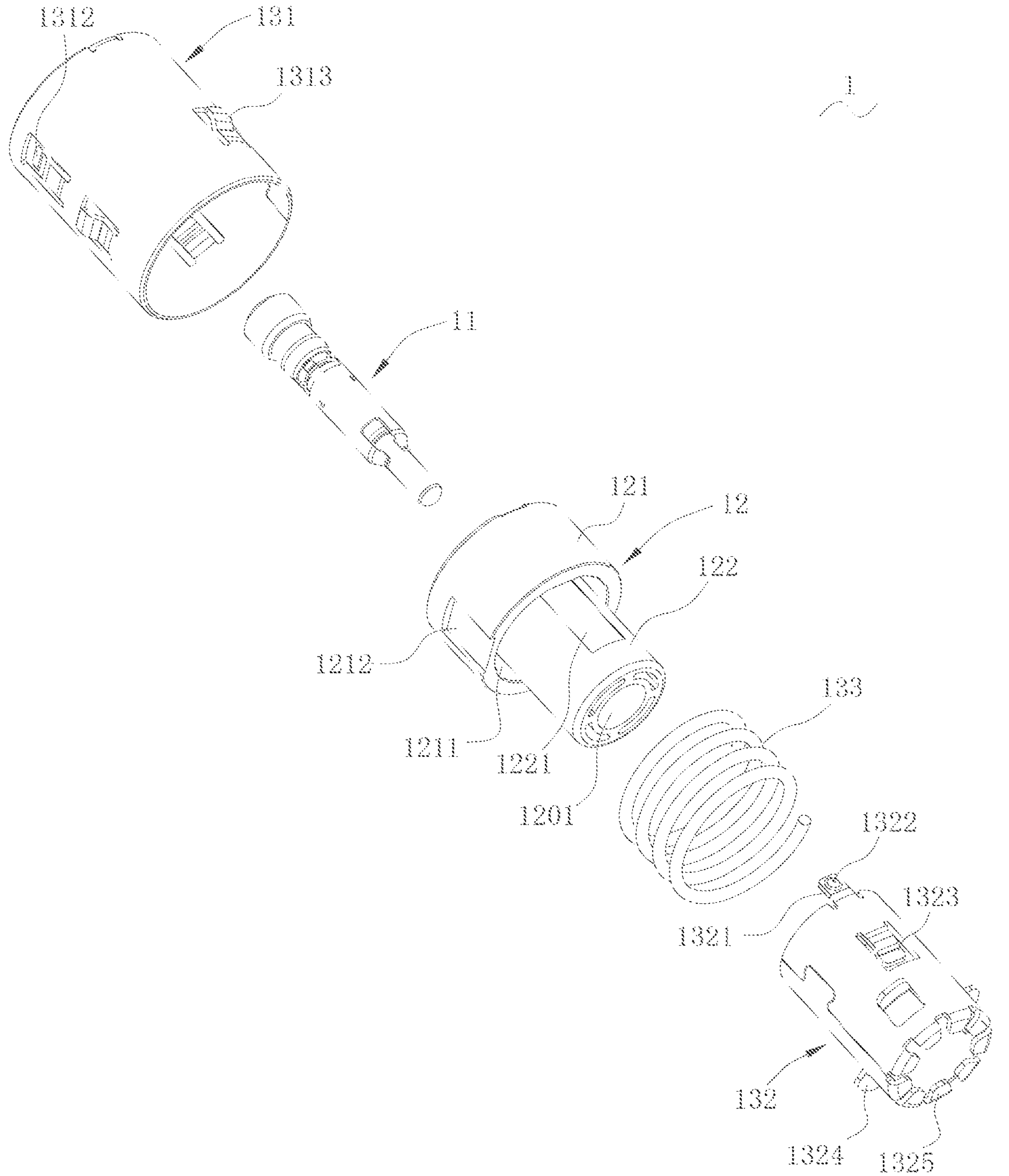

Referring to FIG. 6 to FIG. 8, the floating connector 1 includes a center conductive structure 11, an insulative body 12 which surrounds an outer circumference of the center conductive structure 11, and an outer conductive structure 13 which is provided to an outer circumference of the insulative body 12.

Figure 9:
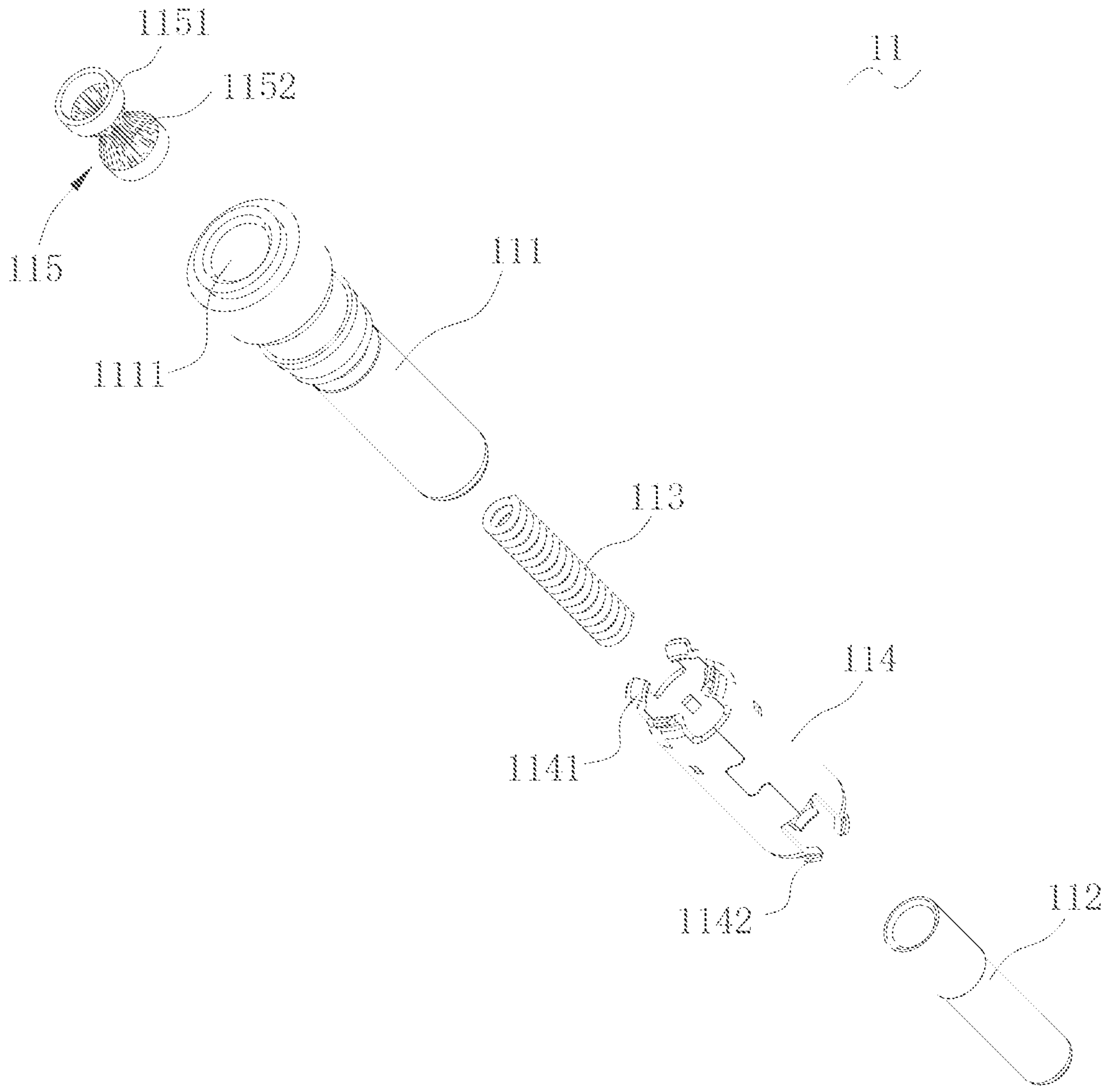
FIG. 9 is a perspective exploded view of a center conductive structure of FIG. 7.

Referring to FIG. 9, the center conductive structure 11 of the preferred embodiment includes a main body 111, a contact pin 112, a center spring 113, a sleeve 114 and a crown spring 115.

In combination with FIG. 6 to FIG. 9, the contact pin 112 is movably mounted in a front portion of the main body 111, the center spring 113 is received between the front portion of the main body 111 and a rear portion of the contact pin 112, two ends of the center spring 113 respectively elastically abut against the main body 111 and the contact pin 112 so as to allow the contact pin 112 to be capable of elastically moving forwardly or rearwardly relative to the main body 111.

The sleeve 114 sheathes an outer circumference of the main body 111, rear claws 1141 extend rearwardly from a rear end of the sleeve 114, the rear claws 1141 latch with the outer circumference of the main body 111. Front claws 1142 extend forwardly from a front end of the sleeve 114, the front claws 1142 elastically abut against an outer circumferential wall of the contact pin 112, and when the contact pin 112 moves forwardly or rearwardly, the front claws 1142 always maintain contact with the contact pin 112. Provision of the sleeve 114 can strengthen conductive contact between the main body 111 and the contact pin 112, and promote reliability of electrical connection of the center conductive structure 11.

The crown spring 115 has two circular barrel portions 1151 which are spaced apart from each other in a front-rear direction and plate springs 1152 which are connected between the two circular barrel portions 1151. The plate springs 1152 are uniformly arranged along a circumferential direction of the circular barrel portion 1151 in form of cage. The crown spring 115 may be formed by stamping a beryllium bronze strip with high elasticity.

In the preferred embodiment, a rear portion of the main body 111 is provided with a mating cavity 1111, the crown spring 115 is mounted in the mating cavity 1111, so that the two circular barrel portions 1151 attach to an inner wall of the mating cavity 1111, the plate springs 1152 protrude inwardly into the mating cavity 1111. Each plate spring 1152 is arcuate so that a center of each plate spring 1152 protrudes toward the interior of the mating cavity 1111, and may elastically deform in a radial direction perpendicular to the front-rear direction, each plate spring 1152 forms an elastic mating portion. A space surrounded by the plate springs 1152 may allow the cable connector 2 to insert therein and provide electrical connection.

Referring to FIG. 7 and FIG. 8, the insulative body 12 includes a base body 121 and a post body 122 which extends forwardly from the base body 121. An outer contour of the base body 121 and an outer contour of the post body 122 each are substantially circular cylindrical, an outer diameter of the base body 121 is larger than an outer diameter of the post body 122.

An outer side surface of the base body 121 is provided with a stopping groove 1212, the stopping groove 1212 penetrates a front end surface of the base body 121. The base body 121 is provided with two receiving grooves 1211 which penetrate the interior of the base body 121 in the front-rear direction, the two receiving grooves 1211 are symmetrically positioned to two sides of the post body 122 respectively.

An outer side surface of the post body 122 is provided with two sliding grooves 1221 which extend in the front-rear direction, in the present embodiment, the sliding groove 1221 is communicated with the corresponding receiving groove 1211. In other embodiments, the sliding groove 1221 also may be spaced apart from the receiving groove 1211 in a circumferential direction of the insulative body 12.

A center of the insulative body 12 is provided with a mounting hole 1201 which penetrate the insulative body 12 in the front-rear direction, so that the insulative body 12 surrounds the outer circumference of the center conductive structure 11. Referring to FIG. 6, the center conductive structure 11 is mounted in the mounting hole 1201, the main body 111 of the center conductive structure 11 slightly extends rearwardly out of the base body 121 of the insulative body 12, the contact pin 112 of the center conductive structure 11 extends forwardly out of the post body 122 of the insulative body 12.

As shown in FIG. 6, the outer conductive structure 13 includes a first conductive shell 131, a second conductive shell 132 and an outer spring 133.

In combination with FIG. 6 to FIG. 8, the first conductive shell 131 substantially is circular barrel-shaped, two first contact arms 1311 are plate-shaped, firstly bend inwardly from a rear end of the first conductive shell 131, then bend forwardly and extend, the two first contact arms 1311 are cantilevered to enter into the interior of the first conductive shell 131. A side wall of the first conductive shell 131 is provided with an opening close to a rear end of the side wall of the first conductive shell 131 and a stopping tab 1312 protrudes inwardly from the opening. Mounting elastic pieces 1313 which each protrude outwardly are provided to a middle portion of the first conductive shell 131 along a circumferential direction of the first conductive shell 131, the mounting elastic piece 1313 protrudes outwardly from an opening which is positioned at a middle portion of the side wall of the first conductive shell 131.

The first conductive shell 131 sheathes an outer circumference of the base body 121, the two first contact arms 1311 are correspondingly received in the two receiving grooves 1211 respectively. And the stopping tab 1312 may correspondingly enter into the stopping groove 1212, so as to limit the first conductive shell 131 to detach rearwardly from the base body 121.

Continuously referring to FIG. 6 to FIG. 8, the second conductive shell 132 is circular barrel-shaped, two second contact arms 1321 extend rearwardly from a rear end of the second conductive shell 132 so as to be cantilevered, two second contact arms 1321 are symmetrically provided. A tip of each second contact arm 1321 is provided with an elastic contact point 1322 which protrudes outwardly.

A middle portion of the second conductive shell 132 is provided with two sliding tabs 1323 which protrude inwardly, the two sliding tabs 1323 are spaced apart from each other and face each other. The sliding tab 1323 is a plate spring structure which protrudes inwardly from a side wall of the second conductive shell 132, the sliding tab 1323 is capable of elastically deforming in a radial direction of the second conductive shell 132.

The second conductive shell 132 is further provided with a plurality of position-limiting tabs 1324 which are positioned in the front of the two sliding tabs 1323 and protrude outwardly, the position-limiting tabs 1324 are uniformly distributed along a circumferential direction of the second conductive shell 132.

Mating pieces 1325 bend from a front end of the second conductive shell 132 and extend inwardly along the radial direction of the second conductive shell 132, the mating pieces 1325 are substantially positioned in a plane which is perpendicular to the front-rear direction, a gap is presented between the adjacent mating pieces 1325.

Mainly referring to FIG. 6, the second conductive shell 132 sheathes an outer circumference of the post body 122, and may move forwardly or rearwardly relative to the post body 122, the second conductive shell 132 extends forwardly beyond the first conductive shell 131. The two sliding tabs 1323 respectively correspondingly enter into the two sliding grooves 1221, and the sliding tab 1323 may move forwardly or rearwardly along the sliding groove 1221, which may guide and limit forward or rearward movement of the second conductive shell 132.

The two second contact arms 1321 correspondingly rearwardly enter into the two receiving grooves 1211 of the base body 121, the elastic contact point 1322 of each second contact arm 1321 elastically abuts against the corresponding first contact arm 1311. When the second conductive shell 132 moves forwardly or rearwardly, the second contact arm 1321 slides forwardly or rearwardly relative to the first contact arm 1311, and the second contact arm 1321 always maintains elastic abutting against the first contact arm 1311, which makes the second conductive shell 132 and the first conductive shell 131 always maintain electrical contact.

When the second conductive shell 132 and the first conductive shell 131 incline relative to each other, the second contact arm 1321 may elastically deform so as to swing along the radial direction of the second conductive shell 132, and in turn the second contact arm 1321 still elastically abuts against the first contact arm 1311. In addition, the two sliding tabs 1323 also may elastically deform so as to allow that the second conductive shell 132 may entirely incline relative to the insulative body 12, and in such an inclined state, the second conductive shell 132 still may smoothly move forwardly or rearwardly relative to the insulative body 12.

It is noted that, in the preferred embodiment, the second contact arm 1321 is cantilevered to extend along the front-rear direction, the second contact arm 1321 may elastically deform to constitute an elastic contact arm, by using elastic deformation of the second contact arm 1321, the second conductive shell 132 is capable of maintaining electrical contact with the first conductive shell 131 in a vibrating environment. In other embodiment not shown, it also may be that the first conductive shell 131 is provided with an elastic contact arm, for example, the first contact arm 1311 is provided so that the first contact arm 1311 may elastically deform and elastically abut against the second conductive shell 132, it also may be that the first conductive shell 131 and the second conductive shell 132 each are provided with an elastic contact arm so that t the first conductive shell 131 and the second conductive shell 132 elastically abut against each other. In a word, the first conductive shell 131 and the second conductive shell 132 maintain electrical contact with each other via the elastic contact arm.

Continuously referring to FIG. 6, the outer spring 133 is positioned between the first conductive shell 131 and the second conductive shell 132, specifically, the outer spring 133 sheathes an outer circumference of the second conductive shell 132, a front end of the outer spring 133 elastically abuts against the position-limiting tabs 1324 of the second conductive shell 132, a rear end of the outer spring 133 elastically abuts against the base body 121 of the insulative body 12. Depending on elastic deformation of the outer spring 133, the second conductive shell 132 and the first conductive shell 131 are allowed to move forwardly or rearwardly and incline and swing in the radial direction under an external force, and are allowed to elastically restore after the external force is released.

An assembling process of the floating connector 1 substantially is: assembling and forming the center conductive structure 11, mounting the center conductive structure 11 into the insulative body 12 from the rear to the front, the insulative body 12 is integrally formed by injection molding, making the first conductive shell 131 sheathe the base body 121 of the insulative body 12, finally making the second conductive shell 132 sheathed with the outer spring 133 sheathe the post body 12 of the insulative body 122 from the front to the rear.

Figure 10:
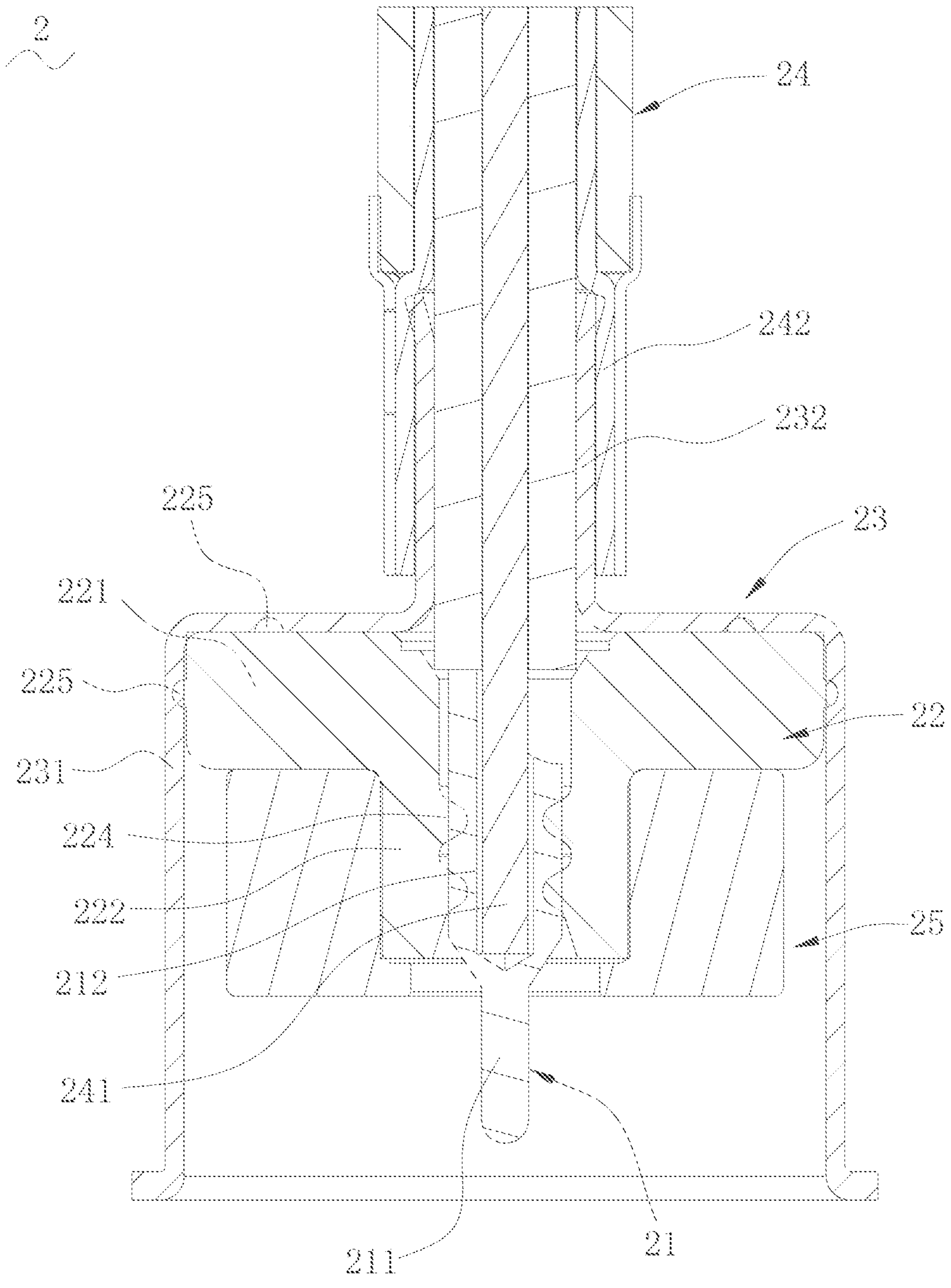
FIG. 10 is a cross sectional view of a cable connector of FIG. 4.
Figure 11:
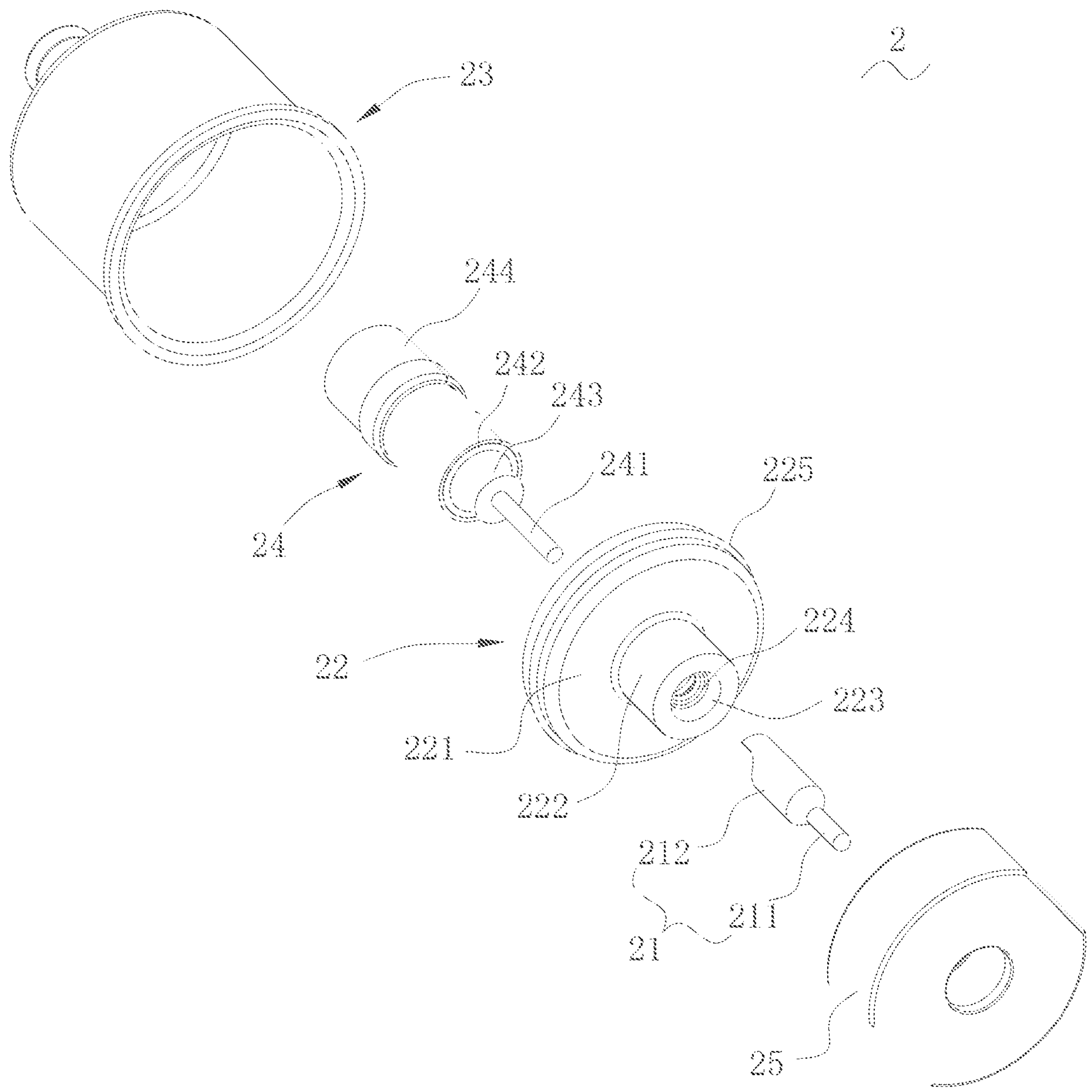
FIG. 11 and FIG. 12 are perspective exploded views of the cable connector of FIG. 4 from two different angles.
Figure 12:
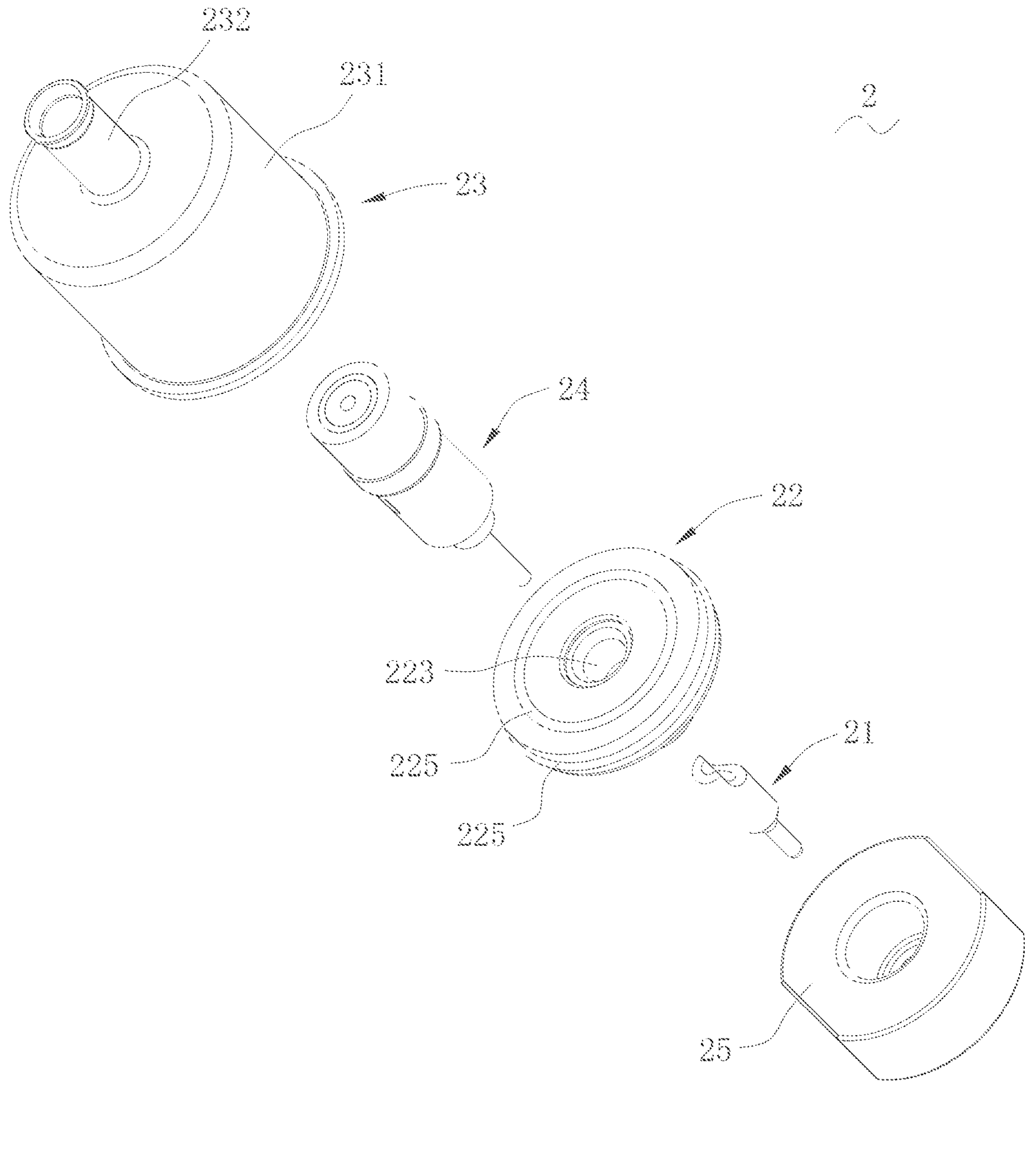

Referring to FIG. 10 to FIG. 12, the cable connector 2 of the preferred embodiment includes a center conductive pin 21, a cable sealing member 22 which sheathes an outer circumference of the center conductive pin 21, an outer shell 23 which further sheathes an outer circumference of the cable sealing member 22, a cable 24 which is electrically connected behind the center conductive pin 21 and the outer shell 23, and an inner insulative base 25 which sheathes a front end of the cable sealing member 22.

The center conductive pin 21 includes a center mating portion 211 which is needle-shaped and a pin barrel portion 212 which is positioned behind the center mating portion 211 and is substantially barrel-shaped.

The cable sealing member 22 is a step-shaped structure, includes a rear sealing portion 221 which has a larger outer diameter and a front sealing portion 222 which extends forwardly from the rear sealing portion 221 and has a smaller outer diameter. A center of the cable sealing member 22 is provided with a through hole 223 which penetrates the cable sealing member 22 in the front-rear direction.

A plurality of first sealing ribs 224 are provided to an inner wall of the through hole 223 of the front sealing portion 222 and protrude inwardly, the first sealing ribs 224 each are provided to encircle along the circumferential direction of the through hole 223, the first sealing ribs 224 are arranged to be spaced apart from each other along an axis direction of the through hole 223.

A plurality of second sealing ribs 225 respectively protrude outwardly from an outer circumferential wall and a rear end surface of the rear sealing portion 221, each second sealing rib 225 is annular and is provided to encircle an axis of the through hole 223.

The cable sealing member 22 sheathes an outer circumference of the pin barrel portion 212 of the center conductive pin 21 via the through hole 223, and the center mating portion 211 of the center conductive pin 21 extends forwardly out of the cable sealing member 22. The first sealing rib 224 encircles and seals the pin barrel portion 212, the first sealing rib 224 is squeezed by the pin barrel portion 212 so that sealing effect is formed between the cable sealing member 22 and the center conductive pin 21.

The outer shell 23 includes a receiving barrel portion 231 which is opened at a front end of the receiving barrel portion 231 and a cable connecting portion 232 which extends rearwardly from the receiving barrel portion 231. An outer contour of the receiving barrel portion 231 and an outer contour of the cable connecting portion 232 each is barrel-shaped, an outer diameter of the receiving barrel portion 231 is larger than an outer diameter of the cable connecting portion 232.

The receiving barrel portion 231 sheathes an outer circumference of the rear sealing portion 221 of the cable sealing member 22, an inner circumferential wall of the receiving barrel portion 231 and the second sealing rib 225 protruding from the outer circumferential wall of the rear sealing portion 221 squeeze each other, a rear wall of the receiving barrel portion 231 and the second sealing rib 225 protruding from the rear end surface of the rear sealing portion 221 squeeze each other, so that waterproof sealing is formed.

The inner insulative base 25 sheathes an outer circumference of the front sealing portion 222 of the cable sealing member 22. When the inner insulative base 25 is subjected to an external force which acts rearwardly, the inner insulative base 25 rearwardly squeezes the cable sealing member 22, which may promote the second sealing rib 225 and the outer shell 23 to closely cooperate with each other to form reliable sealing effect.

The cable 24 has a core conductor 241 which is positioned at a center of the cable 24, an outer conductor 242 which surrounds an outer periphery of the core conductor 241, an insulative layer 243 which is interposed between the core conductor 241 and the outer conductor 242, and an insulative sheath 244 which covers at the outermost circumference of the cable 24.

A front end of the core conductor 241 inserts into the pin barrel portion 212 of the center conductive pin 21, so that electrical connection between the core conductor 241 and the center conductive pin 21 is formed. The outer conductor 242 sheathes the cable connecting portion 232 of the outer shell 23 and the outer conductor 242 is fixed to the cable connecting portion 232 of the outer shell 23, so that ground connection is formed.

In the cable connector 2 of the present embodiment, a first sealing connection is formed between the first sealing ribs 224 and the center conductive pin 21, a second sealing connection is formed between the second sealing ribs 225 and the outer shell 23, moisture entering at the cable 24 may be prevented from being transferred forwardly, so that sealing effect is attained.

Furthermore, a location where the cable 24 and the cable connecting portion 232 are connected further may be additionally covered by a glue by means of glue dispensing, so as to further function as waterproof.

Based on the above introduction on structures of each component of the floating connector assembly 100, again referring to FIG. 3, a front end of the cable connector 2 inserts into a rear end of the floating connector 1, the front end of the floating connector 1 mates with the electrical connector 702. In addition, the mounting elastic pieces 1313 of the first conductive shell 131 of the floating connector 1 abut against a rear wall of the receiving cavity 501, a front end of the outer shell 23 of the cable connector 2 abuts against a front wall of the cable connection post 502, so that the floating connector assembly 100 is positioned and mounted in the image picking up module 500.

Here, the center conductive pin 21 of the cable connector 2 inserts into the mating cavity 1111 of the center conductive structure 11 of the floating connector 1, the center mating portion 211 of the center conductive pin 21 electrically contacts the crown spring 115 of the center conductive structure 11, the contact pin 112 of the center conductive structure 11 elastically abuts against a center of the electrical connector 702, so that electrical connection from the connector 702 to the cable 24 may be established. Because the contact pin 112 may elastically slide relative to the main body 111 along the front-rear direction, and the crown spring 115 may elastically deform in the radial direction which is perpendicular to the front-rear direction, so when the electrical connector 702, the center conductive structure 11 and the center conductive pin 21 deform in the front-rear direction and the radial direction, by means of such an elastic sliding and such an elastic deformation, the electrical connection can be always maintained in a vibrating environment.

The outer shell 23 of the cable connector 2 sheathes an outer circumference of the outer conductive structure 13 of the floating connector 1, the receiving barrel portion 231 of the outer shell 23 connects with the first conductive shell 131 of the outer conductive structure 13, the second conductive shell 132 of the outer conductive structure 13 elastically abuts against the electrical connector 702, so that ground connection from the electrical connector 702 to the cable 24 is established. Because the second conductive shell 132 and the first conductive shell 131 can maintain electrical contact therebetween by means of the second contact arm 1321 and the first contact arm 1311 when the second conductive shell 132 and the first conductive shell 131 slide forwardly or rearwardly and are inclined and mate with each other, so that reliability of the ground connection can be maintained in a vibrating environment.

Therefore, with the floating connector assembly 100, it may realize signal transmission between the circuit board 700 and the external electronic device, and may be capable of maintaining good electrical connection in a vibrating environment, promote stability of electrical contact. At the same time, based on the structure of the floating connector 1, it further may avoid an independent external spring plate being introduced therein, simplify the structure and the assembling step.

Figure 13:
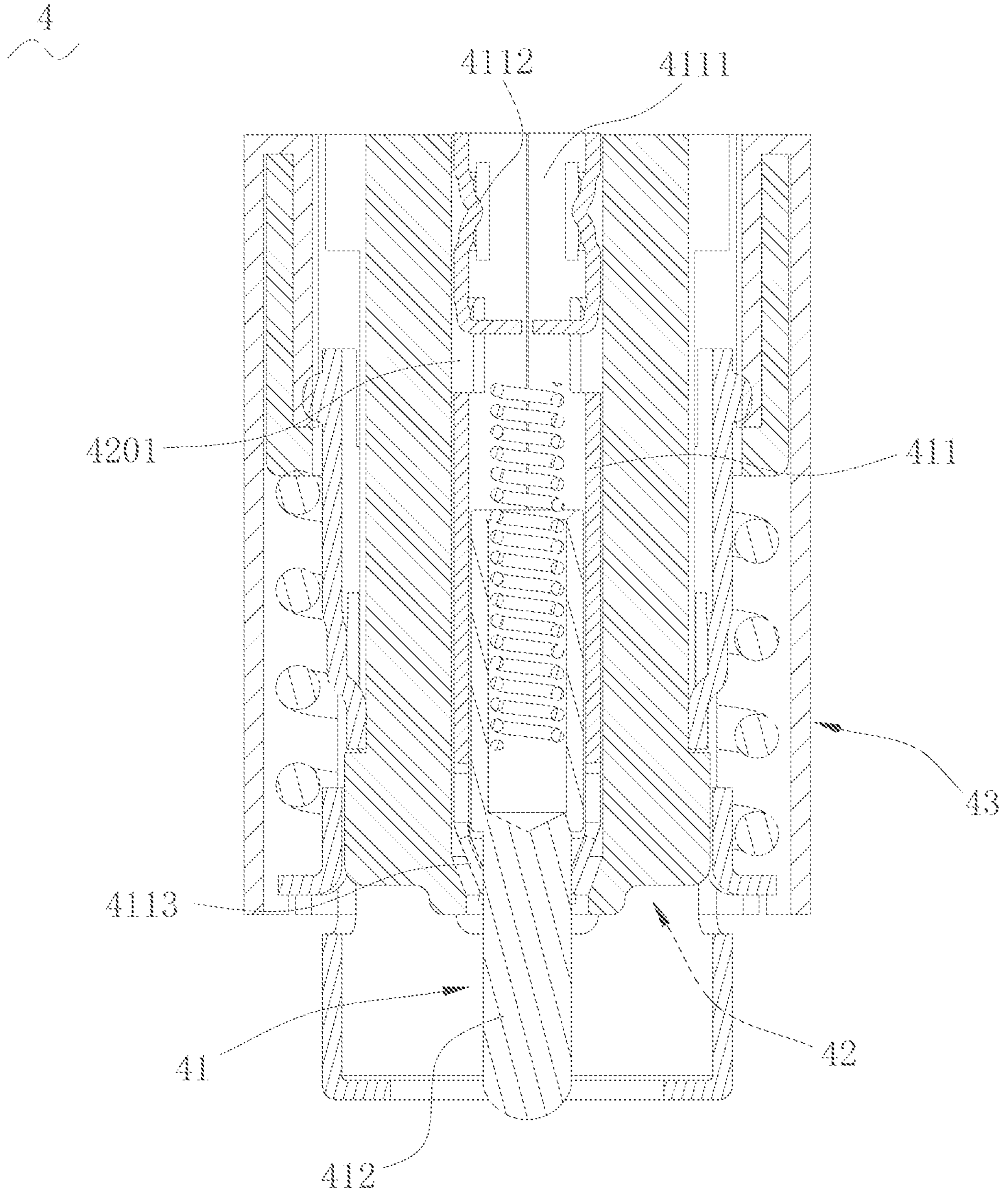
FIG. 13 is a cross sectional view of a floating connector of another preferred embodiment.

FIG. 13 schematically illustrates a cross sectional structure of a floating connector 4 of another preferred embodiment of the present disclosure, similarly, the floating connector 4 includes a center conductive structure 41, an insulative body 42 and an outer conductive structure 43. The floating connector 4 mainly differs from the floating connector 1 of the previous embodiment in the center conductive structure 41.

Figure 14:
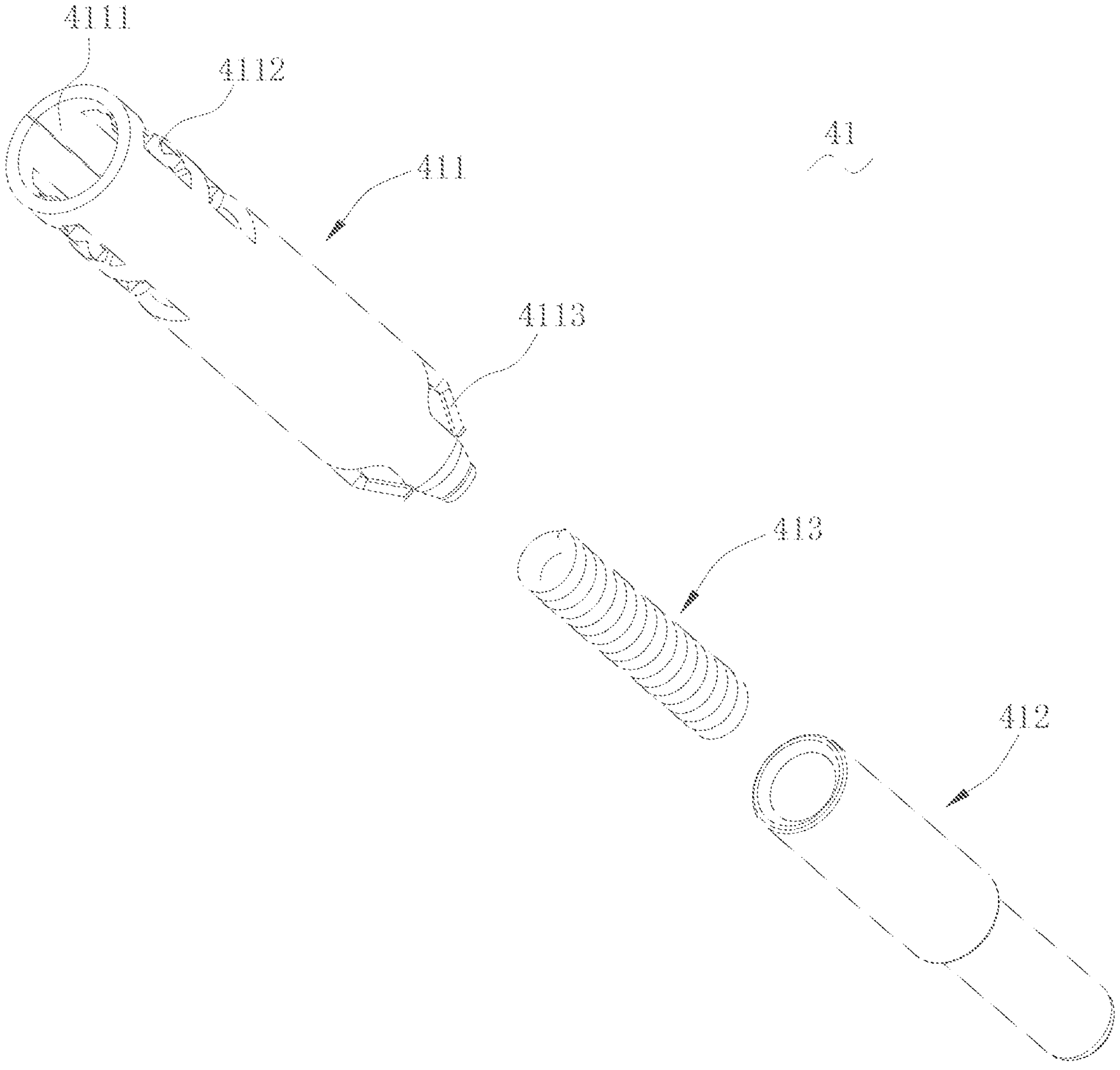
FIG. 14 is a perspective exploded view of a center conductive structure of FIG. 13.

In combination with FIG. 13 and FIG. 14, the center conductive structure 41 includes a main body 411, a contact pin 412 and a center spring 413, the sleeve and the crown spring are not provided.

Here, the main body 411 is a structure which is formed by integrally stamping and bending a metal plate, a rear portion of the main body 411 is provided with a mating cavity 4111, a side wall of the rear portion of the main body 411 is provided with openings and elastic mating portions 4112 are formed to bend inwardly from the corresponding openings toward the mating cavity 4111, the elastic mating portion 4112 can elastically deform in a radial direction which is perpendicular to the front-rear direction, which may allow the center conductive pin 21 of the cable connector 2 to be inclined and mate with the main body 411.

Elastic claws 4113 extend forwardly from a front end of the main body 411, the elastic claws 4113 elastically abut against the contact pin 412 to strengthen electrical connection between the main body 411 and the contact pin 412.

Corresponding to the center conductive structure 41, a mounting hole 4201 of the insulative body 42 is adaptively adjusted to fix and receive the center conductive structure 41.

Other technical features of the floating connector 4 may refer to the floating connector 1 of the previous embodiment, so description thereof is not repeated.

Figure 15:
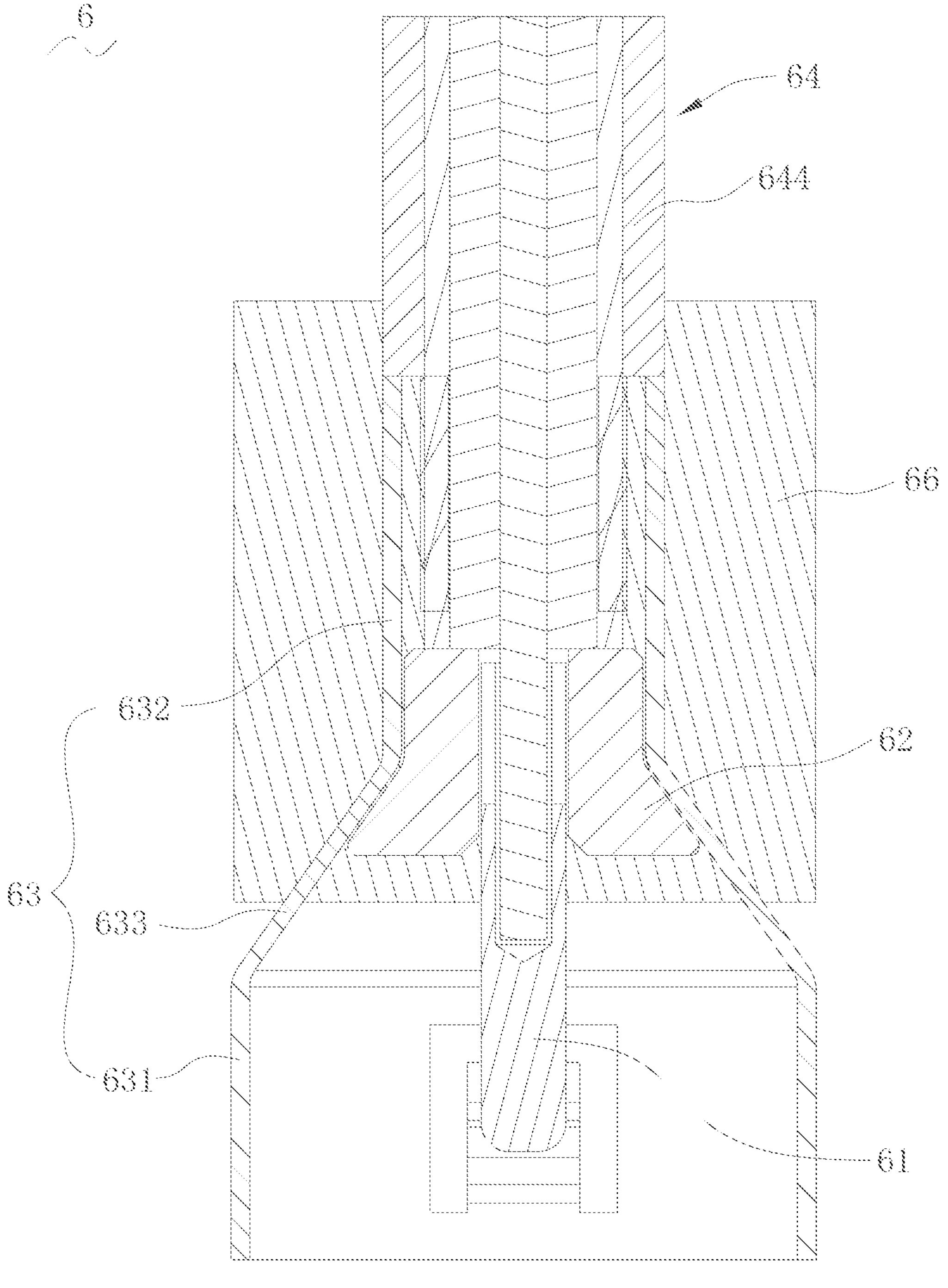
FIG. 15 is a cross sectional view of a cable connector of another preferred embodiment.
Figure 16:
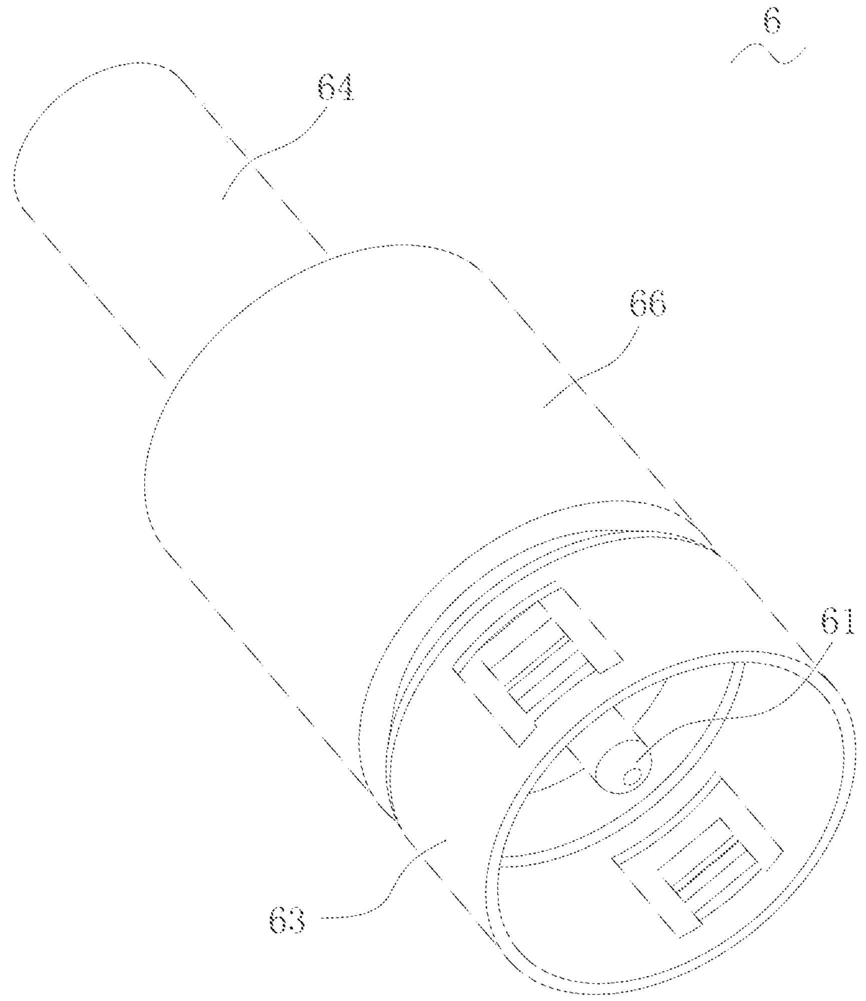
FIG. 16 is a perspective view of FIG. 15.
Figure 17:
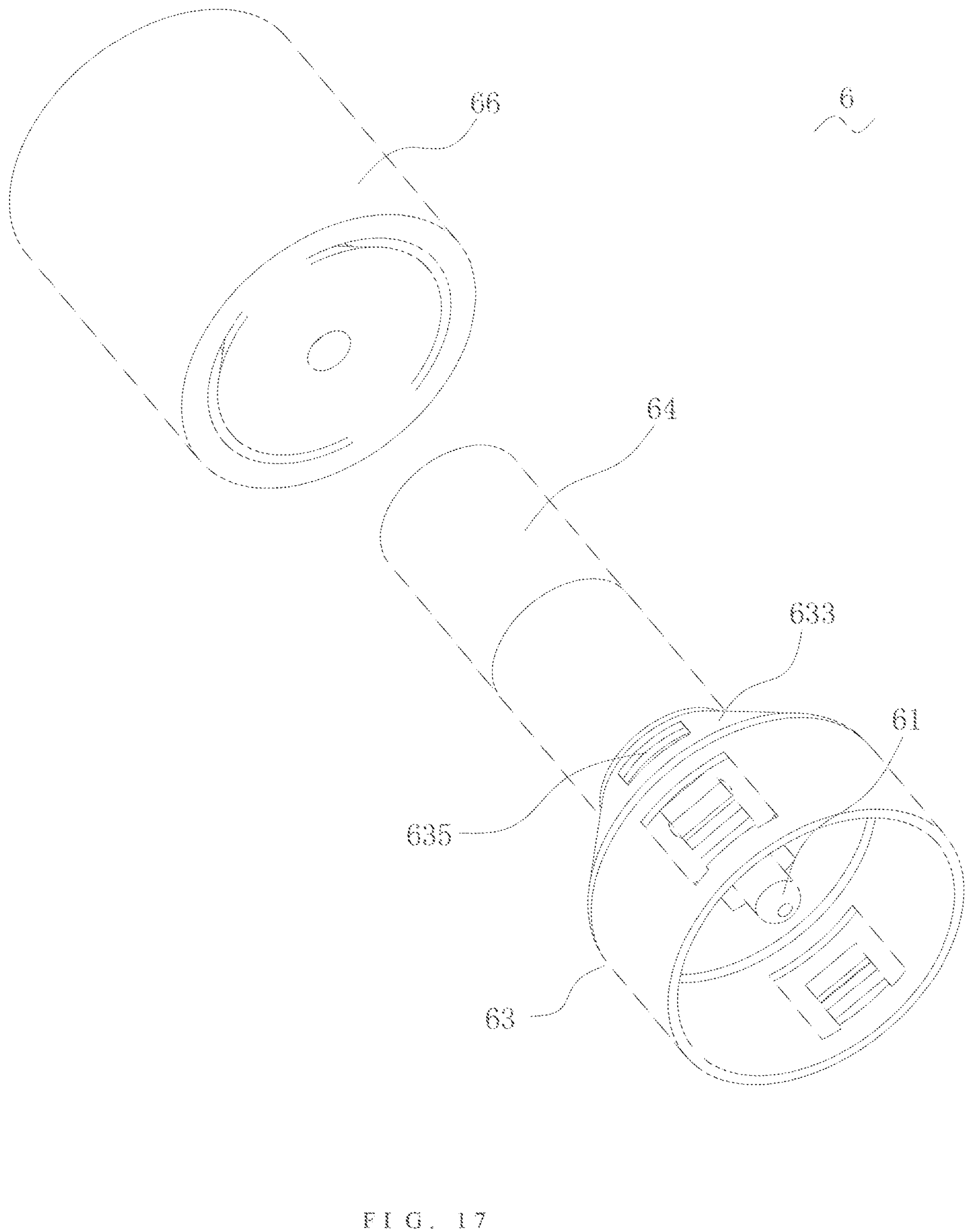
FIG. 17 is a perspective exploded view of FIG. 16.

FIG. 15 to FIG. 17 schematically illustrates a structure of a cable connector 6 of another preferred embodiment of the present disclosure. The cable connector 6 includes a center conductive pin 61, a cable sealing member 62, an outer shell 63 and a cable 64. In comparison with the cable connector 2 of the previous embodiment, the cable connector 6 does not have the inner insulative base, but a sealing adhesive 66 is additionally provided to embed an outer circumference of a location where the outer shell 63 and the cable 64 are connected.

A cone shell portion 633 is between a receiving barrel portion 631 and a cable connecting portion 632 of the outer shell 63 and is frustum-shaped. The cone shell portion 633 is provided with at least one adhesive passing hole 635 which communicates the interior of the outer shell 63 with the exterior of the outer shell 63. The cone shell portion 633 and the cable connecting portion 632 adaptively sheathe an outer circumference of the cable sealing member 62. The cable sealing member 62 is not provided with a sealing rib.

The sealing adhesive 66 embeds an outer circumference of a location where the outer shell 63 and the cable 64 are connected, specifically, the sealing adhesive 66 embeds a rear half portion of the cone shell portion 633, an entirety of the cable connecting portion 632 and a front end of the cable 64 of the insulative sheath 644 therein. And the sealing adhesive 66 enters into the interior of the outer shell 63 via the adhesive passing hole 635 to embed the cable sealing member 62 therein.

The sealing adhesive 66 positioned at the exterior of the outer shell 63 blocks a gap between the outer shell 63 and the cable 64, the sealing adhesive 66 positioned in the interior of the outer shell 63 may block a gap between the cable sealing member 62 and the center conductive pin 61, so that external moisture may be prevented from entering into the cable 64 and moisture is prevented from being forwardly transferred from the cable 64, sealing waterproof effect is attained.

Other technical features of the cable connector 6 may refer to the cable connector 2 of the previous embodiment, so description thereof is not repeated here.

The above described contents are only the preferred embodiments of the present disclosure, which cannot limit the implementing solutions of the present disclosure, those skilled in the art may conveniently make corresponding variation or modification based on the main concept and spirit of the present disclosure, therefore the extent of protection of the present disclosure shall be determined by terms of the claims.

What is claimed is:

1. A floating connector, comprising:

a center conductive structure which comprises a main body, a contact pin which is movably mounted in a front portion of the main body and a center spring which is mounted between the contact pin and the main body, a rear portion of the main body being provided with a mating cavity, an elastic mating portion being provided in the mating cavity and being capable of elastically deforming in a radial direction which is perpendicular to a front-rear direction;

an insulative body which surrounds an outer circumference of the center conductive structure; and an outer conductive structure comprising a first conductive shell which is provided to an outer circumference of the insulative body, a second conductive shell which movably sheathes the outer circumference of the insulative body, and an outer spring which is positioned between the first conductive shell and the second conductive shell, the second conductive shell being positioned in the first conductive shell, at least one of the first conductive shell and the second conductive shell being provided with an elastic contact arm, and the first conductive shell and the second conductive shell maintaining electrical contact via the elastic contact arm.

2. The floating connector according to claim 1, wherein a plurality of first contact arms extend inwardly from a rear end of the first conductive shell and then extend forwardly, a plurality of second contact arms extend rearwardly from a rear end of the second conductive shell, the second contact arms and the first contact arms are capable of sliding forwardly or rearwardly relative to each other and maintain elastically abut against each other.

3. The floating connector according to claim 2, wherein the first contact arm is plate-shaped, the second contact arm is cantilevered and is provided with an elastic contact point which protrudes outwardly, the elastic contact point elastically abuts against the first contact arm.

4. The floating connector according to claim 2, wherein the insulative body comprises a base body and a post body which extends forwardly from the base body, the base body is provided with receiving grooves which penetrate the base body in the front-rear direction;

the first conductive shell sheathes an outer circumference of the base body, the first contact arms are received in the receiving grooves respectively;

the second conductive shell sheathes an outer circumference of the post body, the second contact arms enter rearwardly into the receiving grooves respectively.

5. The floating connector according to claim 4, wherein the second conductive shell extends forwardly beyond the first conductive shell;

the post body is provided with sliding grooves which extend in the front-rear direction, the second conductive shell is provided with a plurality of sliding tabs which protrude inwardly, the sliding tabs are capable of slidably forwardly or rearwardly entering into the sliding grooves respectively.

6. The floating connector according to claim 4, wherein the second conductive shell is provided with a plurality of position-limiting tabs which protrude outwardly, the outer spring sheathes an outer circumference of the second conductive shell, one end of the outer spring abuts against the position-limiting tabs, the other end of the outer spring abuts against the base body of the insulative body.

7. The floating connector according to claim 1, wherein the center conductive structure further comprises a crown spring which is mounted in the mating cavity, the crown spring comprises two circular barrel portions which are provided to two ends of the crown spring respectively and the elastic mating portions which are connected between the two circular barrel portions and protrude inwardly.

8. The floating connector according to claim 1, wherein the main body is formed by integrally stamping and bending, a side wall of the rear portion of the main body bends inwardly toward the mating cavity to form the elastic mating portion.

9. A floating connector assembly, comprising the floating connector of claim 1 and a cable connector which mates with the floating connector from behind;

the cable connector comprising a center conductive pin, a cable sealing member which sheathes an outer circumference of the center conductive pin, an outer shell which further sheathes an outer circumference of the cable sealing member, and a cable which is electrically connected behind the center conductive pin and the outer shell;

the center conductive pin being inserted into the mating cavity of the floating connector and contacting with the elastic mating portion;

the outer shell sheathing an outer circumference of the first conductive shell of the floating connector.

10. The floating connector assembly according to claim 9, wherein a plurality of first sealing ribs protrude inwardly from an inner wall of the cable sealing member, the first sealing ribs encircle and seal the center conductive pin;

a plurality of second sealing ribs protrude outwardly from an outer wall of the cable sealing member;

the cable connector further comprises an inner insulative base which sheathes a front end of the cable sealing member, the second sealing ribs of the cable sealing member and the outer shell closely cooperate with each other.

11. The floating connector assembly according to claim 9, wherein the outer shell is provided with an adhesive passing hole, the cable connector further comprises a sealing adhesive which embeds an outer circumference of a location where the outer shell and the cable are connected, and the sealing adhesive enters into the interior of the outer shell via the adhesive passing hole to embed the cable sealing member therein.

* * * * *